Feb. 13, 1923.
E. REISZ
1,445,412
PROCESS FOR PRODUCING SOUND WAVES
Filed Nov. 10, 1921
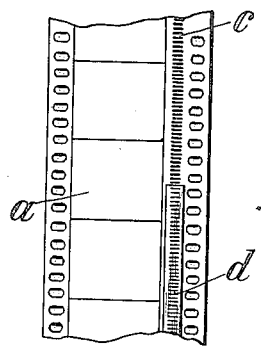
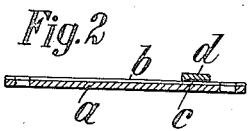
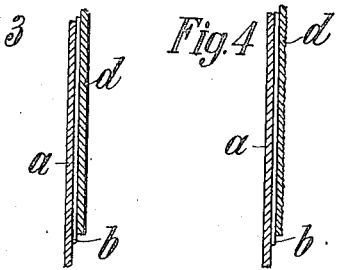
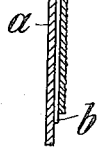
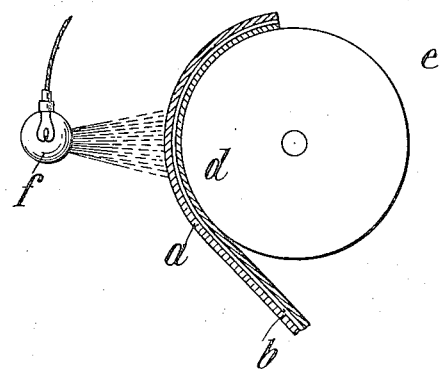
INVENTOR
EUGEN REISZ
BY
ATTORNEYS Patented Feb. 13, 1923.

1,445,412

UNITED STATES PATENT OFFICE.

EUGEN REISZ, OF BERLIN-ZEHLENDORF, GERMANY.

PROCESS FOR PRODUCING SOUND WAVES.

Application filed November 10, 1921. Serial No. 514,423.

*To all whom it may concern:*

Be it known that I, EUGEN REISZ, a citizen of the Republic of Hungary, residing at Berlin-Zehlendorf, Germany, have invented certain new and useful Improvements in Processes for Producing Sound Waves, of which the following is a full, clear, and exact description.

The invention relates to a process for producing sound vibrations in moving pictures on a single film, and has for its object, to intensify at will the loudness of the sounds during reproduction and to use a positive film in its customary form, that is to say, with a gelatine layer sensitized to light. A further object is to record on a photographic film two or more simultaneously created systems of sound waves with a view of reproducing them later on with the full fidelity of nature. This method is especially adapted to cases in which the sound waves reach the ear from different directions, as for example, when a song is to be sung to an instrumental accompaniment.

These and other objects are attained by the device illustrated in the accompanying drawings, in which, Figure 1 is a fragmentary view in plan of a section of the film.

Figure 2 is a transverse vertical section of the same.

Figure 3 is a longitudinal vertical section of the film before the gelatine coat has been treated with a chrome solution.

Figure 4 is a longitudinal section of the same after the gelatine coat has been treated with the solution.

Figure 5 is a side view of a lighting apparatus for the film.

The sound waves are transformed in a known manner into light fluctuations and these are photographically recorded on the film. After development the sound waves are represented by strokes or lines, ranged parallelly to each other and of shades of more or less pronounced intensity. The breadth of the lines is only 1 to 2 millimetres, so that the rest of the film may be utilized for the recording of the pictures.

The negative film with its pictures and the sound waves, recorded thereon in the form of strokes or lines is copied onto an ordinary positive film. The positive film thus obtained is developed, fixed and dried. Now for intensifying the loudness of the sounds during reproduction, on the gelatinous side of this positive film a second narrow gelatine layer is squirted, which need only be broad enough to completely cover the images of the sound waves in the form of strokes or lines. The thickness of this freshly squirted on layer is to be regulated by the concentration of the gelatine solution and by the velocity of the uniformly moved positive film. The entire positive film is now immersed in ammonium or potassium bichromate and then, after being dried, is exposed, for a rather long period, to the action of light from the back side, this operation being effected by winding the film, with its layer side downwards, on to a drum.

The first effect produced by the action of the light is that the layer (the primary layer) uniformly distributed on the whole positive film, is completely fixed, while the other narrow layer (the secondary one) is, on the contrary, fixed only partially or in accordance with the sound waves, that is to say, the dark portions are less fixed and the light portions more so. The film is then immersed in warm water and the film views or the entire primary layer having been already perfectly fixed by the light, remain entirely unaffected, while the dark portions on the secondary layer are more or less dissolved, thus giving rise to a representation in relief of the sound waves, which conforms with great exactness to the strokes forming the images of the sound waves, as the secondary layer is superposed directly on the said images.

As shown more particularly in Figure 1, the sound waves are fixed to the side of the film in the form of a ribbon C by photography, which ribbon consists of short parallel stripes which are more or less dark. The stripes are obtained in a well-known manner by the proper lighting of the primary gelatine coat B. In the lower part of Figure 1 is shown that on this ribbon of the sound wave picture is fixed a second narrow gelatine coat D which is only required to be broad enough to cover entirely the sound wave picture. When this is done, the film is rolled with the coat side D' downward of a roller E illustrated in Figure 5 and then is subjected to the influence of a light source F. By the influence of the light, the primary gelatine coat B is entirely covered so that it is no more sensitive to the influence of hot water. The second narrow coat D is colored less at those places which are situated under the dark stripes than at the places which are located under the light stripes of the ribbon D. When the film now is placed in hot water the total primary coat B is not affected as the same is completely colored by the light, that is, while from the secondary coat D the places situated under the dark stripes dissolve more than the places located under the light stripes, so that a relief of sound waves is obtained corresponding exactly with the stripes of the sound wave picture C as shown more particularly in Figure 4.

As the images of the sound waves are very narrow, it is possible to record several different systems of sound waves simultaneously on the film. In this manner for instance a song can be recorded which is to be sung to an instrumental accompaniment. For this purpose a separate diaphragm is provided for each sound effect and the movements of the diaphragms, or of the screens controlled by these, are photographed separately on the uniformly moved film. When the waves are to be reproduced, the same number of diaphragms must be employed as when recording, and these are then so located in the room or hall where the performance is to be given, that the sound-effects arrive from the desired point. For the reproduction it will be advisable to choose an electric transmission, so that the distribution of sound-effects from the loud-speaking telephone is accomplished without difficulty.

When the number of wave-systems is two, then the most convenient method of recording them will be to have one system photographed on either side of the optical images, and it is almost superfluous to add that, in this process, the diaphragms employed in the recording and reproducing operations, must have the same situation relatively to each other.

The described process for producing photographically by means of the lines of varying shades of blackness of the negative film on the positive film a strip of images of the sound waves having elevations and depressions, corresponding to the varying shades of blackness of the said lines, can be used for producing ribbon-like supports of sound waves for gramophones and the like.

This can be done in such a manner, that on the relief images of the positive film a strip of a concentrated solution of gelatine is squirted or poured, which, when dried, is drawn off, containing an exact impression of the relief images of sound waves. For the purpose to prevent a sticking of the gelatine on the relief images, these may be covered by an appropriate lac, for instance zapon-lac, before the gelatine is poured upon.

The ribbon with the impressions of the relief images consists of pure gelatine and is therefore soft and flexible so that it can be easily rolled up. It is nearly 0,1 mm. thick and about 1,5 millimetres broad. When the ribbon is to be used for reproducing the sounds, it may be conducted between two rounded points of hard material, of which the one is connected with the membrane of the sound box, the other with the bearing frame of the sound box.

The ribbon may be provided with two parallel strips of images of sound waves, running in opposite directions. In rolling up the ribbon the one strip and in rolling off the other strip comes into action, and the void running of the ribbon is avoided. The ribbon with two parallel strips of images being broader than in the first case, is the more strong, so that a breaking of the ribbon is not to be feared.

Instead of a solution of gelatine also other substances may be used, as for instance celluloid, but gelatine is to be preferred.

The strength of the sounds in reproducing the images of the sound waves can be increased by using a straight edge of the breadth of the images, instead of a rounded point. As this edge rests on the relief not with a point but with a line, the specific pressure is correspondingly diminished. The weight of the sound box therefore can be enlarged and the edge will penetrate deeper into the relief.

I claim:

1. A process for producing sound records, comprising recording sound waves, transformed into light fluctuations on a negative film in form of lines of varying shades of blackness, developing the film, copying this negative film onto an ordinary film, squirting onto the images of the sound waves a second gelatine layer, immersing the film in a light sensitive solution, fixing the first gelatinous layer by the action of the light and treating the film with warm water, for producing a representation in relief of the sound waves.

2. A process for producing sound records, comprising recording sound waves, transformed into light fluctuations on a negative film in form of lines of varying shades of blackness, developing the film, copying this negative film onto an ordinary film, squirting onto the images of the sound waves a second gelatine layer, immersing the film in a light sensitive solution, fixing the first gelatinous layer by the action of the light from the backside of the film, and treating the film with warm water, for producing a representation in relief of the sound waves.

3. A process for producing ribbon-like supports of sound waves, consisting in producing photographically relief images of sound waves on a film, pouring on these relief images a strip of a solution of gelatine or the like, which, when dried, is drawn off and contains an exact impression of the relief images.

4. A process for producing ribbon like supports of sound waves for gramophones and the like, consisting in producing photographically relief images of sound waves on a film, covering these images with a lac, pouring on these relief images a strip of a solution of gelatine or the like, which, when dried, is drawn off and contains an exact impression of the relief images, and drawing off this strip.

In testimony that I claim the foregoing as my invention I have signed my name.

EUGEN REISZ.